United States Patent [19]
Choi et al.

[11] Patent Number: 5,748,971
[45] Date of Patent: May 5, 1998

[54] OPTION CARD HIBERNATION SYSTEM

[75] Inventors: Seung-Beom Choi, Seoul; Shung-Hyun Cho, Kyonggi-do; Noh-Byung Park, Seoul, all of Rep. of Korea

[73] Assignee: SamSung Electronics Co., Ltd., Suwon, Rep. of Korea

[21] Appl. No.: 583,593

[22] Filed: Jan. 5, 1996

[30] Foreign Application Priority Data

Jan. 6, 1995 [KR] Rep. of Korea ............ 1995/187

[51] Int. Cl.⁶ .......................... G06F 1/00; G06F 1/18
[52] U.S. Cl. .................. 395/750.03; 395/750.05; 395/733; 395/735; 395/282; 395/182.12
[58] Field of Search ............... 395/750, 182.12, 395/282, 283, 733, 800, 750.03, 750.05, 750.06

[56] References Cited

U.S. PATENT DOCUMENTS

| | | |
|---|---|---|
| 4,672,573 | 6/1987 | Shonaka . |
| 4,742,482 | 5/1988 | Inskeep et al. . |
| 5,012,406 | 4/1991 | Martin . |
| 5,163,153 | 11/1992 | Cole et al. . |
| 5,218,607 | 6/1993 | Saito et al. . |
| 5,237,692 | 8/1993 | Raasch et al. . |
| 5,311,441 | 5/1994 | Tayama et al. . |
| 5,396,637 | 3/1995 | Harwell et al. . |
| 5,511,204 | 4/1996 | Crump et al. ............ 395/750 |
| 5,546,590 | 8/1996 | Pierce ..................... 395/750 |
| 5,560,022 | 9/1996 | Dunstan et al. ......... 395/750 |
| 5,560,023 | 9/1996 | Crump et al. ........... 395/750 |
| 5,577,220 | 11/1996 | Combs et al. .......... 395/416 |
| 5,586,334 | 12/1996 | Miyazaki et al. ....... 395/750 |
| 5,590,340 | 12/1996 | Morita et al. ........... 395/750 |
| 5,638,541 | 6/1997 | Sadashivaiah .......... 395/750 |
| 5,659,762 | 8/1997 | Sawada et al. .......... 395/750.05 |
| 5,664,203 | 9/1997 | Hong et al. ............. 395/750.05 |

Primary Examiner—Ayaz R. Sheikh
Assistant Examiner—Raymond N. Phan
Attorney, Agent, or Firm—Robert E. Bushnell, Esq.

[57] ABSTRACT

A hibernation system of a computer employing option cards responds to a hibernation interrupt signal generated by a power management system in case of power failure or a period of non-use. In response, an operation controller backs up the present data and outputs a power supply cut-off signal. A basic input/output system calls a software interrupt for storing data when a hibernation suspension function is performed by the operation controller, and calls a software interrupt for restoring data when a hibernation resume function is performed. A plurality of option cards mounted on extension slots connected to the system bus patch the called software interrupt, and either perform an interrupt routine for storing option card register data and chipset data for initialization, or alternatively perform initialization according to stored chipset data and restore the register to a previous state, thereby performing a hibernation function responsive to every option card without overloading the basic input/output system even if the number of the mounted option cards is increased.

13 Claims, 2 Drawing Sheets

5,748,971

OPTION CARD HIBERNATION SYSTEM

CLAIM OF PRIORITY

This application refers to, incorporates herein and claims all benefits accruing under 35 U.S.C. §119 from an application entitled Option Card Hibernation System, that was earlier filed in the Korean Industrial Property Office on 6 Jan. 1995 and there assigned Serial No. 187/1995.

BACKGROUND OF THE INVENTION

1. Field of the Invention

The invention relates to a hibernation system for a computer, and more specifically, to a hibernation system accommodating option cards installed in a computer.

2. Description of the Background Art

With the current increased concern for energy conservation, power-saving functions of computers have been improved so as to include hibernation systems. A hibernation system preferably performs two functions; an emergency data recovery function operating when the power supply is cut off as a result of a power failure or mistake by a user, and a power saving function in which the power supply is intentionally cut off when the computer is not in use for a given time period. In order to perform either function, the computer data is automatically stored in an auxiliary memory device, such as a hard disk, before the main power supply is cut off or in an emergency situation using a low capacity backup battery. Thereafter, the stored data are recovered from the auxiliary memory device when power is again supplied and the computer is restored to its former state.

Hibernation systems equipped with automatic retrieving functions for emergency or power saving use are increasingly popular among users of personal computers. U.S. Pat. No. 5,311,441 to Tayama et al. disclose a Battery Powered Unit with Battery Sensor and Resume Processing Control Means, which performs a battery check before executing a suspend or resume function to determine whether sufficient capacity remains to complete the process. When the power is turned OFF, the contents of the operating system work area, internal registers and the like of the central processing unit, display controller, memory controller, interrupt controller, and other large scale integration peripheral controllers (LSIs) are successively stored in a suspend save area of a battery backed random access memory (RAM), and a suspend bit is set. A resume process is carried out in a reverse sequence to return the unit to its former state when the power is turned ON.

U.S. Pat. No. 5,218,607 to Saito et al. discloses a Computer Having a Resume Function And Operable On An Internal Power Source, which includes a power control unit for outputting over the system bus a 'low-battery' non-maskable interrupt (NMI) when an abnormal power supply output voltage is detected, or a 'power OFF' NMI when a power switch is operated. The central processing unit responds to the particular NMI by instructing the power control unit to discontinue supplying operating power, but first may set a system data flag and save system data necessary for restoring data processing in progress into a backup RAM. The system data stored include the contents of the central processing unit registers, information of various LSIs and the value of the program pointer. The backup RAM, along with a RAM for storing programs and data for processing, a video RAM for storing display image data, and an extended RAM detachably mounted into an exclusive card slot, are supplied with a backup voltage by a small 'sub-battery' built into the computer body in order to retain the stored data. When the power switch is again operated or normal power resumes, the system boot process checks the system data flag in order to determine whether or not to restore saved system data to the original location.

More recent systems relating to the emergency automatic data recovery function and the power saving function for computers are disclosed in Korean Patent Application No. 93-31255 entitled Supplementary Power Supply For Backing Up The Working Environment In An Emergency, filed on Dec. 30, 1993, Korean Patent Application No. 94-13939 entitled Stop Clock Controlling Machine, filed on Jun. 20, 1994, Korean Utility Model Application No. 93-3116 entitled Power Controlling Device Of The Computer Peripheral Equipment, filed on Mar. 4, 1993, and Korean patent Application No. 92-14590 entitled Circuit Generating The Power Interruption Signal In The Computer Peripheral Equipment, filed on Aug. 13, 1992.

The central processing unit, memory and various other operational hardware components of a personal computer typically communicate over a system bus having one or more extension slots for mounting an edge connector of an optional peripheral component electronic circuit board (hereinafter, option card). The configuration of the extension slots may be proprietary, but generally conforms to a recognized standard, such as the Extended International Standard Architecture (EISA), in order to accommodate a wide variety of option cards from different manufacturers. In order to implement a hibernation function on a computer system employing option cards and later resume operation at the point of suspension, the basic input output system (hereinafter BIOS) conventionally saves and then later restores the chipset data corresponding to a particular installed option card. Namely, when the central processing unit finishes a hibernation state after saving the data of a presently operating option card for the reason that hibernation is started on the way that the option card performs a specific operation, the BIOS resets the chipset data according to the initialization to perform the program of the option card to be operated again.

For instance, a BIOS supporting a specific sound card stores the data of a register corresponding to the functional chipset into an auxiliary memory storage unit in a hibernation suspend mode and restores the stored data in a hibernation resume mode. When the BIOS must support a hibernation mode for each installed option card however, we have discovered that a problem is created by the shortage of program capacity in the BIOS. Furthermore, it is our opinion that the BIOS should be successively upgraded for each additional option card supported, thereby creating a greater load on the basic input/output system with each successive upgrade.

SUMMARY OF THE INVENTION

It is therefore an object of the present invention to provide an improved process and hibernation system.

It is another object to provide a hibernation system for a computer employing one or more option cards.

It is yet another object to provide a hibernation system capable of supporting a large number and variety of option cards without substantial burden.

It is still another object to provide a hibernation system employing option cards responsive to a specific interrupt called by a basic input output system for saving and retrieving chipset and register data of the option card.

It is still yet another object to provide an option card which patches an interrupt to perform its own hibernation interrupt routine.

These and other objects may be achieved with an option card hibernation system constructed according to the principles of the present invention, having a power management system for outputting a hibernation interrupt signal when an impending power failure is detected or a predetermined period of non-use occurs. An operation control system backs up the current data to storage in response to the hibernation interrupt signal and generates a power supply cut-off signal. A basic input/output system calls a software interrupt for storing current option card data when a hibernation function is performed by the operation control system, and calls a software interrupt for restoring the option card data in order to resume operation after a hibernation state. A plurality of option cards mounted in extension slots patch the called software interrupts and set their own interrupt routines for storing register data and chipset data for initializing, and for performing initialization according to the stored chipset data and restoring the register.

A hibernation suspend process accommodating an option card according to a preferred embodiment of the present invention includes storing the central processing unit register data and the present state of the computer hardware when a hibernation interrupt is generated. The basic input/output system calls a software interrupt for backing up an option card, whereupon the option card patches an interrupt routine backing up the chipset data for initialization and the register state of the option card. The entire current contents of the graphics card memory and the system memory of the computer are backed up into an auxiliary memory, and a flag is set indicating that backup data storage is finished in the hibernation mode. The power supply to the computer system is then cut off.

A hibernation resume process accommodating an option card according to a preferred embodiment of the present invention includes initializing a computer when power is again supplied after being turned off. A hibernation flag is checked, and a normal booting process is performed when the hibernation flag is not set. If the hibernation flag is set however, the system memory data and graphics memory data are restored from an auxiliary memory storage unit, and the basic input/output system calls a software interrupt for restoring the data of an option card. The option card patches an interrupt routine for performing initialization according to stored chipset data and a prior state of the register. Data in the registers of the central processing unit and a state of the operational computer hardware existing before hibernation are restored to regenerate the previous job environment.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
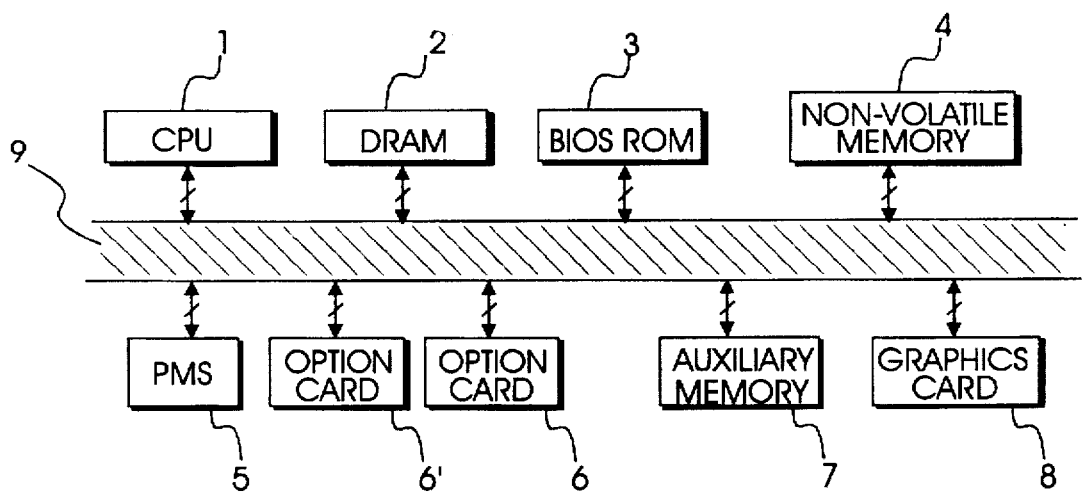
FIG. 1 is a configuration block diagram of the hibernation system accommodating an option card according to a preferred embodiment of the invention.

Turning first to FIG. 1, a hibernation system responsive to an option card according to a preferred embodiment of the invention has a central processing unit (CPU) 1, a power management system (PMS) 5, a system dynamic random access memory (DRAM) 2, a non-volatile memory 4, an auxiliary memory storage unit 7, and a graphics card 8 communicating over a system bus 9. A read only memory (ROM) 3 connected to the bus 9 stores a basic input/output system (BIOS), essentially a series of instructions for controlling the basic operation of the central processing unit 1. One or more option cards 6 and 6' are mounted in extension slots of the bus 9.

When a power failure or a period of non-use is detected, the power management system 5 generates a hibernation interrupt signal. In response, the CPU 1 checks whether a hibernation set-up flag is set in the non-volatile memory 4, and if so performs a hibernation suspend process.

Figure 2:
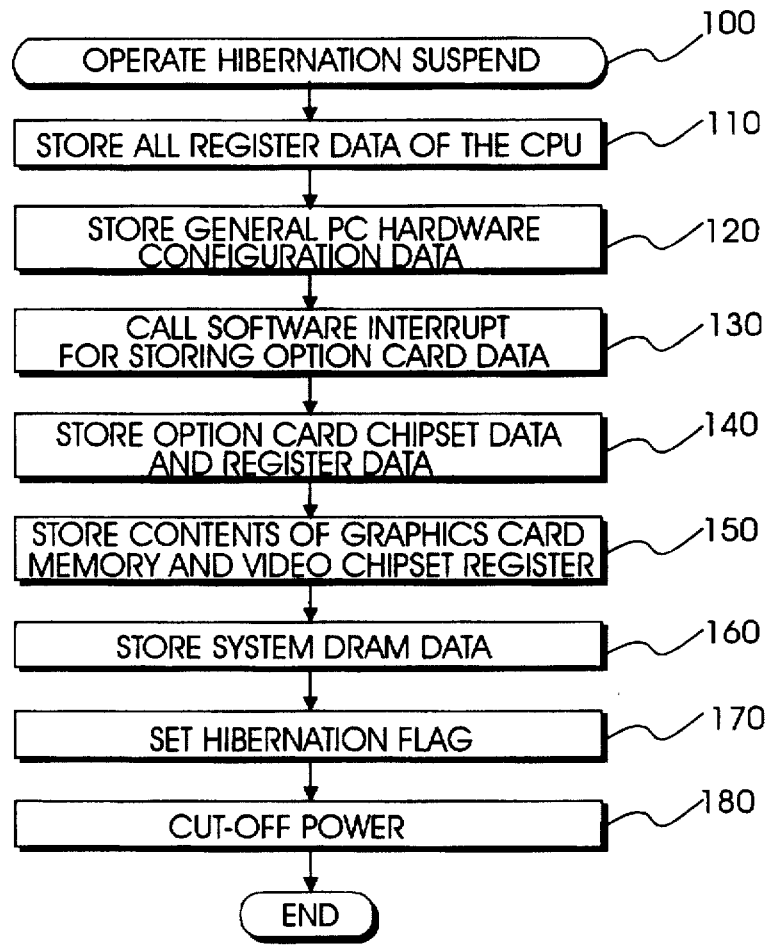
FIG. 2 is an flowchart illustrating the hibernation suspend process accommodating an option card according to a preferred embodiment of the invention.

A hibernation suspend process according to the principles of the present invention is illustrated in FIG. 2. In step 110, the CPU 1 stores its own register data in the auxiliary memory 7, and in step 120 stores the present state of the operational hardware of the computer in DRAM 2. In step 130, the BIOS stored in ROM 3 calls a software interrupt for storing the current state of an option card 6. In step 140, the option card patches the software interrupt called by the BIOS in order to perform its own software interrupt routine for storing the chipset data and the register data followed after initialization, for example according to the following sample program stored in an option card memory (not-illustrated).

| SAMPLE PROGRAM 1 | (software patch program of option card) |
|---|---|
| Initialize | |
| MOV AX 25, 77H | (Int 77H) |
| MOV DX offset | Option Save Routine |
| PUSH CS | |
| POP DS | |
| INT 21H | |
| SAMPLE PROGRAM 2 | (option card storing program) |
| Option Save Routine | |
| CMP AH, 00H | (Int 77H AH=00H if it is an option card storing software interrupt) |
| JNE EXIT | |
| ⎡ 1) option card chipset and register storing | |
| ⎣ 2) option card data storing | |
| EXIT : IRET | |

In the first sample program, a software interrupt called by the BIOS is patched to the option card. MOV denotes a move command, while DX and AX denote kinds of registers. PUSH denotes a command to store a code segment CS onto a stack, while POP denotes a command to recover a data segment DS from the stack. INT 21H means to call an interrupt twenty-one hexadecimal.

In the second program, a comparison CMP is performed to determine if the value of the interrupt seventy-seven hexadecimal stored in a register AH is equal to the value 00 hexadecimal, a hibernation interrupt designating option card storing should be performed. JNE EXIT denotes jumping to an exit line when the two values are not equal, but otherwise storing option card chipset and register data. EXIT:IRET simply denotes a return from the interrupt routine.

In the above program, if the BIOS calls a hibernation interrupt, the central processing unit 1 determines that the data of chipset and register should be stored responsive to the hibernation function by patching an interrupt and performing the storing operation illustrated above. When a plurality of option cards are mounted in the extended slots, each option card patches the interrupt and stores the chipset and register data as described above.

In steps 150 and 160, the CPU 1 stores the contents of a graphics card memory and chipset register and the contents of the system DRAM in auxiliary memory 7. In step 170, CPU 1 sets a hibernation flag in the non-volatile memory 4, indicating that data storing according to the hibernation function was completed. Finally, the CPU 1 in step 180 outputs a power cut-off signal to the power management system 5 of FIG. 1, cutting off the power supply to the system and ending the hibernation suspend process.

Figure 3:
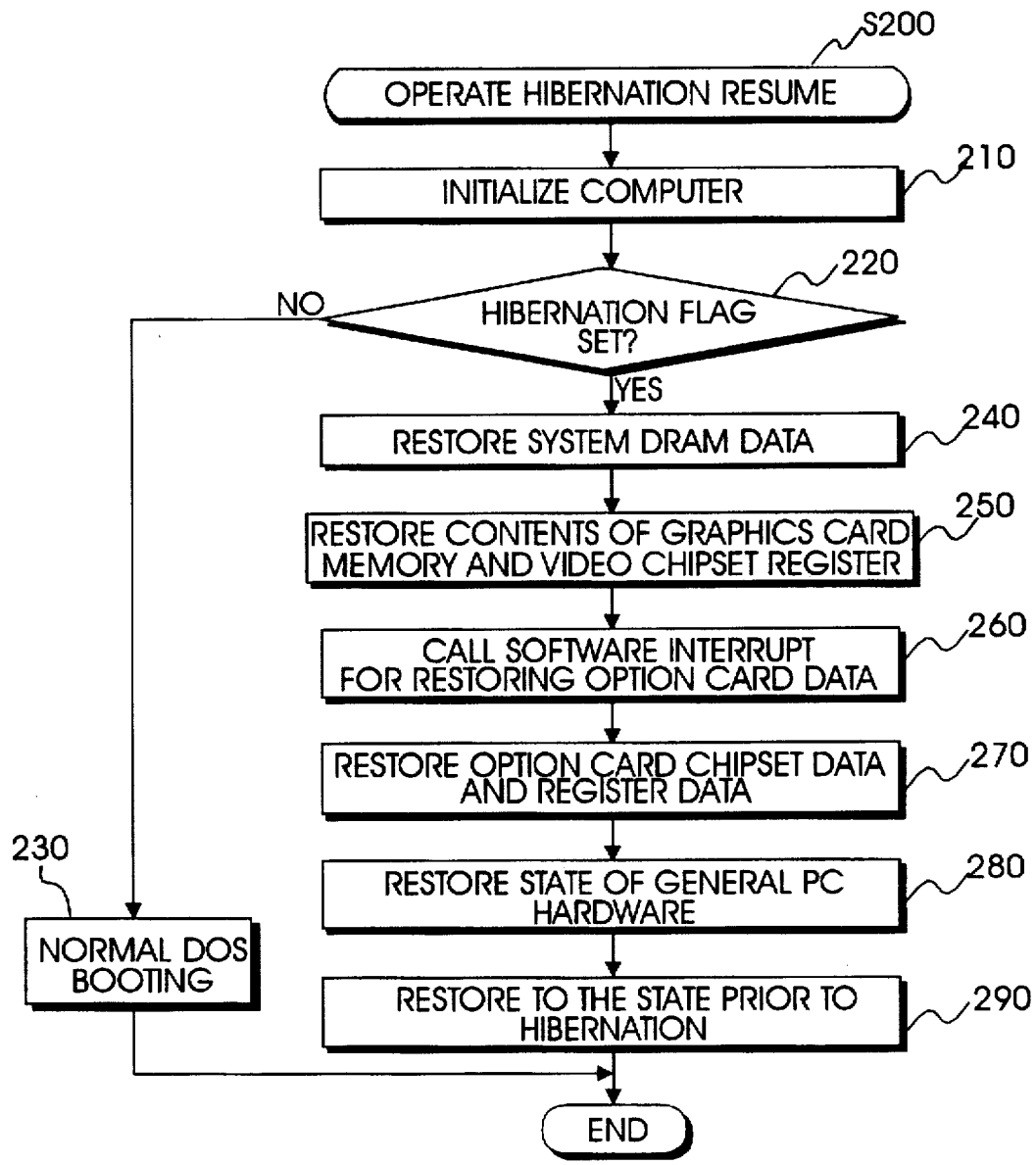
FIG. 3 is an flowchart illustrating the hibernation resume process accommodating an option card according to a preferred embodiment of the invention.

If a user operates a switch in order to use the computer after a hibernation suspend operation, the hibernation resume process illustrated in FIG. 3 is performed. In step 210, the central processing unit 1 is initialized and in step 220 determines if the hibernation flag in the non-volatile memory 4 is set. The CPU 1 performs normal disk operating system (DOS) booting operation in step 230 when the hibernation flag is not set. On the other hand, when the hibernation flag is set, CPU 1 in steps 240 and 250 restores the contents of the DRAM 2, the contents of the graphics card memory and the state of the video chip register from the data stored in auxiliary memory 7.

In step 260, the BIOS calls the software interrupt to restore the data of the option card. In response, the option card 6 in step 270 patches the software interrupt called by the BIOS and restores the chipset and register data followed after initialization and stored in its own memory (not illustrated), and is ready to perform a respective option card function responsive to the central processing unit by performing an initialization according to the set chipset data. In step 280, the CPU 1 restores the stored state of operational computer hardware, and in step 290 ends the hibernation routine after restoring the job environment to the state existing prior to the hibernation suspend process.

In an option card hibernation system as disclosed herein, the basic input/output system does not support a hibernation function for each option card installed in the computer, but instead each option card has an interrupt routine for storing and restoring the option card data responsive to a software interrupt called by the basic input/output system, thereby performing the hibernation function for each option card without overloading the basic input/output system even when the number of mounted option cards is increased.

While the invention has been particularly shown and described with the reference to the preferred embodiment of the present invention thereof, it should be appreciated by those skilled in the art that the foregoing and other changes in form and detail may be made without departing from the spirit and scope of the present invention.

What is claimed is:

1. A hibernation system for a computer having a hibernation state and an operating state and employing option cards, comprising:

a power management system for outputting a hibernation interrupt signal in case of power failure or a period of non-use;

an operation controlling means for performing a hibernation function comprising backing up a current operating state upon receiving an output hibernation interrupt signal from the power management system, and outputting a power supply cut-off signal and for performing a restoring function for restoring the computer into said current operating state just prior to the performing of the hibernation function when a particular event occurs;

a basic input/output system means for causing a generation of a software interrupt for storing option card data once the hibernation function is to be performed by the operation controlling means and a software interrupt for restoring option card data when the restoring function is to be performed by the operation controlling means; and a plurality of option cards mounted on extension slots, each option card, in response to said software interrupt for storing option card data of the basic input/output system means, causes the generation of a software interrupt for storing data by generating an interrupt routine for storing chipset data and register data for initializing, and in response to said software interrupt for restoring option card data of the basic input/output system means, causes the generation of a software interrupt for restoring the option data by generating an interrupt routine for performing initialization according to the previously stored chipset data and register data.

2. A hibernation system as recited in claim 1, wherein each of said option cards, in case more than one option card is mounted, successively stores and restores the data from each option card according to its own software interrupt routine in response to the software interrupt caused to be generated by the basic input/output system means.

3. A hibernation suspend method for a computer system employing option cards, comprising the steps of:

archiving data corresponding to a current operating state of a computer and register data read from a central processing unit of said computer when an event does not occur within a predetermined period of time;

causing a generation of software interrupt for archiving data read from an option card by a basic input/output system;

archiving chipset data for initialization of a register when a software interrupt is generated by the option card in response to an interrupt being generated by said basic input/output system;

backing up the data of a graphics card memory and a system memory in an auxiliary memory; and setting a flag indicating that data storage has been completed in a hibernation suspend mode before cutting off power to the computer system.

4. A hibernation suspend method as recited in claim 3, wherein if more than one option card is mounted, the option card data storing step further comprises a step in which each option card performs a restoring of the data according to its own software interrupt routine in response to the software interrupt being generated by the basic input/output system.

5. A hibernation resume method for a computer system employing option cards, comprising the steps of:

performing initialization of the computer system operationally coupled to an option card and when a supply of electrical power is restored to the computer system;

determining whether a hibernation flag has been set, performing a booting process when said hibernation flag has not been set and restoring memory data to a main memory of the computer system from an auxiliary memory of the computer system when said hibernation flag has been set;

generating a software interrupt for restoring option card data via a basic input/output system, the option card data being read from the option card prior to restoration of said electrical power to the computer;

generating an interrupt routine by the option card in response to said software interrupt of the basic input/output system, said option card interrupt routine restoring option card chipset data, performing initialization and restoring an option card register to a state existing prior to said restoration; and restoring data of the register and a state of hardware of the computer system existing prior to said restoration and restoring the computer system to an operational state existing prior to said restoration.

6. The hibernation resume method of claim 5, wherein if where more than one option card is employed, each option card generates its own software interrupt routing in response to the software interrupt generated by the basic input/output system and restores its own option card data in succession.

7. A hibernation system for a computer employing option cards, comprising:

a power management system for generating a hibernation interrupt signal in response to one of a power failure and non-use of the computer for a given time period;

operation control means for archiving current data representing a computer operating state upon receiving a hibernation interrupt signal from the power management system, generating a power supply cut-off signal and restoring the computer to said operating state when a particular user event occurs;

a basic input/output system for causing a generation of a software interrupt for storing option card data when said operation control means archives current data, and for generating a software interrupt for restoring the option card data when said operation control means restores the computer to a former operating state; and a plurality of option cards mounted in extension slots of a system bus of the computer, each of said option cards generating its own software interrupt for storing data in response to the interrupt generated by a basic input/output system, said interrupt routine storing option card register data and chipset data for initializing, and generating a software interrupt for restoring option card data in response to the interrupt generated by said basic input/output system, said interrupt routine performing initialization in accordance with stored chipset data and restoring stored option card register data.

8. The hibernation system of claim 7, comprised of successively storing and restoring data read from each of said plurality of option cards in accordance with the option card interrupt routine in response to the software interrupt generated by the basic input/output system.

9. A hibernation method for a computer system, and said method comprising the steps of:

duplicating information representing a present state of the computer system and register data of a central processing unit of said computer system in response to a hibernation interrupt signal indicating non-use of the computer system for a predetermined period;

generating a software interrupt via a basic input/output system when duplicating data from an option card mounted in an extension slot of a bus for the computer system;

transmitting said software interrupt to the option card to access an interrupt routine stored by the option card for archiving chipset data and register data from the option card;

duplicating information from a graphics card memory and a system memory in an auxiliary memory;

setting in a non-volatile memory a hibernation flag indicating completion of storage of said information from said graphics card memory and said system memory in the auxiliary memory; and interrupting a supply of electrical power to the computer system.

10. The hibernation method of claim 9, further comprising mounting a plurality of option cards in extension slots of the computer system bus, each of said option cards receiving the software interrupt generated by the basic input/output system in succession and archiving corresponding chipset and register data from said plurality of option cards in said auxiliary memory.

11. The hibernation method of claim 9, further comprising:

performing initialization of the computer system upon resuming said supply of electrical power to the computer system;

determining whether said hibernation flag has been set;

when said hibernation flag has not been set, performing a booting process to initiate operation of said computer system; and when said hibernation flag has been set, restoring the system memory and graphics card memory from data stored in said auxiliary memory, transmitting a software interrupt generated by said basic input/output system to the option card, performing an interrupt routine stored in the option card for restoring a register state and initializing chipset data in accordance with data previously stored in response to a received software interrupt, and restoring register data of the central processing unit and a hardware state for the computer system.

12. A hibernation resume method for a computer system comprising the steps of:

initializing the computer system having a central processing system when electrical power is supplied to said computer system;

determining whether a hibernation flag has been set;

when the hibernation flag has not been set performing a booting process enabling functional operation of said computer system; and when the hibernation flag bas been set, restoring a system memory and a graphics card memory of said computer system from data stored in an auxiliary memory, transmitting a software interrupt generated by a basic input/output system to an option card operationally coupled to said computer system via an extension slot of a bus of said computer system, performing an interrupt routine stored in the option card for restoring a register state and initializing chipset data in accordance with data previously stored in response to the received software interrupt, and restoring register data of the central processing unit and a hardware state of the computer system.

13. The hibernation resume method of claim 12, comprising:

generating an interrupt in response to said interrupt generated by said input/output system for each of a plurality of option cards coupled to said computer system; and restoring in succession, data stored in each of said plurality of option cards prior to interruption of electrical power to said computer system.

* * * * *